(12) United States Patent
Dorais et al.

(10) Patent No.: US 8,353,372 B2
(45) Date of Patent: Jan. 15, 2013

(54) TRACKED VEHICLE

(75) Inventors: Sebastien Dorais, Granby Quebec (CA); Michel Pelletier, Quebec (CA); Martin Runggaldier, St. Christina (IT)

(73) Assignee: Rolic Invest S.AR.L., Luxembourg (LU)

( * ) Notice: Subject to any disclaimer, the term of this patent is extended or adjusted under 35 U.S.C. 154(b) by 685 days.

(21) Appl. No.: 11/868,322

(22) Filed: Oct. 5, 2007

(65) Prior Publication Data

US 2009/0000833 A1 Jan. 1, 2009

(30) Foreign Application Priority Data

Oct. 6, 2006 (EP) .................................... 06020982

(51) Int. Cl.
*B62D 55/00* (2006.01)

(52) U.S. Cl. .......... 180/9.1; 180/9.48; 180/9.5; 180/208

(58) Field of Classification Search ................. 180/9.48, 180/9.5, 208
See application file for complete search history.

(56) References Cited

U.S. PATENT DOCUMENTS

| | | |
|---|---|---|
| 3,170,533 A | 2/1965 | Fewel et al. |
| 3,227,295 A | 1/1966 | Hamilton et al. |
| 3,534,701 A | 10/1970 | Hebert |
| 3,763,944 A | 10/1973 | Kaltenegger |
| 4,087,135 A | 5/1978 | Unruh |
| 4,348,825 A | 9/1982 | Bachler |
| 4,500,139 A | 2/1985 | Tucek |
| 4,788,783 A | 12/1988 | Bachler |
| 5,062,493 A | 11/1991 | Platter et al. |
| 5,067,263 A | 11/1991 | Pelletier |
| 6,155,363 A | 12/2000 | Matsumoto et al. |
| 6,354,023 B1 | 3/2002 | Trahan et al. |
| 6,418,645 B1 | 7/2002 | Hammerle et al. |
| 6,637,134 B2 | 10/2003 | Hammerle |
| 6,810,609 B2 | 11/2004 | Lassonde et al. |
| 6,921,304 B2 * | 7/2005 | Hewitt ........................ 440/12.52 |
| 6,983,927 B2 | 1/2006 | Pelletier et al. |
| 7,296,862 B2 * | 11/2007 | Albright et al. ............... 305/145 |
| 7,464,699 B2 | 12/2008 | Joppig et al. |
| 7,530,547 B2 | 5/2009 | Leitner et al. |
| 2002/0139013 A1 | 10/2002 | Hammerle |
| 2003/0051376 A1 | 3/2003 | Lassonde et al. |
| 2003/0159840 A1 | 8/2003 | Schmidt, Jr. |

(Continued)

FOREIGN PATENT DOCUMENTS

AT   0 395 922   4/1993

(Continued)

OTHER PUBLICATIONS

European Examination Report from corresponding foreign application (EP06020982), dated Nov. 6, 2008.

(Continued)

*Primary Examiner* — Tony H. Winner
*Assistant Examiner* — Jacob Knutson
(74) *Attorney, Agent, or Firm* — Neal, Gerber & Eisenberg LLP

(57) ABSTRACT

A tracked vehicle, particularly a piste grooming vehicle, comprising a chassis frame and at least one sprocket for a track is characterized in that the sprocket has limited movement between a working position—in which the sprocket protrudes beyond the chassis frame—and a transit position in which the sprocket is located at least partially, preferably totally, within the width of the chassis frame.

15 Claims, 5 Drawing Sheets

U.S. PATENT DOCUMENTS

| | | | |
|---|---|---|---|
| 2004/0069981 A1 | 4/2004 | Pelletier et al. | |
| 2005/0252592 A1* | 11/2005 | Albright et al. | 152/379.3 |
| 2005/0279980 A1 | 12/2005 | Leitner et al. | |
| 2007/0151220 A1* | 7/2007 | Bergsten | 56/2 |
| 2008/0257616 A1 | 10/2008 | Olsson | |
| 2008/0269986 A1 | 10/2008 | Regnell et al. | |
| 2008/0309157 A1 | 12/2008 | Runggaldier et al. | |
| 2009/0007461 A1 | 1/2009 | Pelletier et al. | |

FOREIGN PATENT DOCUMENTS

| | | |
|---|---|---|
| CA | 2 443 765 | 4/2004 |
| DE | 2 145 772 | 3/1973 |
| DE | 2 148 304 | 4/1973 |
| DE | 2 219 623 | 11/1973 |
| DE | 2254276 | 5/1974 |
| DE | 3 440 491 | 5/1986 |
| DE | 3534626 A1 | 3/1987 |
| DE | 295 15 866 U1 | 1/1996 |
| DE | 296 03 251 | 4/1996 |
| DE | 103 20 523 A1 | 11/2004 |
| EP | 0 551 160 | 7/1993 |
| EP | 1 405 782 | 4/2004 |
| EP | 1 674 382 | 10/2005 |
| EP | 1 591 350 | 11/2005 |
| EP | 1 827 954 | 12/2005 |
| EP | 1 872 683 | 1/2008 |
| EP | 1 908 672 | 4/2010 |
| FR | 2 336 292 | 7/1977 |
| FR | 75 39445 | 7/1977 |
| FR | 2 536 437 | 5/1984 |
| FR | 2 586 727 | 3/1987 |
| GB | 1 590 358 | 6/1981 |
| JP | 1144287 | 6/1989 |
| JP | 03-182887 | 8/1991 |
| JP | 7-237566 | 9/1995 |
| WO | WO2005093173 | 10/2005 |
| WO | WO2006069671 | 7/2006 |
| WO | WO2006069682 | 7/2006 |

OTHER PUBLICATIONS

European Search Report from corresponding foreign application (EP06020982), dated Mar. 16, 2007.
Everest Parkdesigner Catalog, published on the Internet, Apr. 2003.
PistenBully 600 Catalog, published in Germany, Feb. 2006.
Patent Abstract for Japanese Patent Application No. 05200998 for Crawler Vehicle.
European Search Report dated Mar. 16, 2007.
Scout PistenBully brochure published Jan. 2006.
Patent Abstract for German Patent Publication No. DE 3534626.
Patent Abstract for German Patent Publication No. DE 10320523A1.

* cited by examiner

TRACKED VEHICLE

PRIORITY CLAIM

This application is a continuation of, claims the benefit of, and priority to European Patent Application No. 06020982.2, filed Oct. 6, 2006, the entire contents of which are incorporated herein by reference.

The present disclosure relates to a tracked vehicle, and particularly a piste grooming vehicle, including a chassis frame and at least one sprocket for a track.

BACKGROUND

To optimize footprint performance in minimum time, vehicles (sometimes referred to as a snow cat) with an ever-wider track are employed for piste grooming so that wider tracks, fixed and rotary ploughs can be fitted to the vehicle to get the job done quicker in fewer operating hours of the vehicle. When these snow cats need servicing or are relocated, they often need to be loaded on trucks for transit. Because these snow cats are so wide, they often necessitate extra-wide special transit vehicles which, apart from being a traffic nuisance, are very costly. Additionally, such special transit trucks are often barred from access to ski resorts on many high pass and side roads.

SUMMARY

One advantage of present disclosure is thus to provide a generic tracked vehicle for facilitated transit.

This is achieved by an advantageous embodiment of the disclosure in that the sprocket now has limited movement between a working position—in which the sprocket protrudes beyond the chassis frame—and a transit position in which the sprocket is located at least partially, and preferably totally, within the width of the chassis frame.

In this way the sprockets, usually engineered highly massive, can now be moved—preferably on both opposite sides of the tracked vehicle—to respective positions within the width of the chassis frame so that the width of the snow cat for transit effectively corresponds to the maximum width of the chassis frame. This achieves a reduction in the effective width of the snow cat and making truck transit more readily possible to ski resorts with difficult road access.

In accordance with a preferred embodiment of the disclosure, the sprocket is mounted on the chassis frame by a sprocket mount.

In this case, it is favorable when the sprocket mount is mounted on the chassis frame for pivoting, preferably about a horizontal or substantially horizontal axis, advantageously in a pivoting range of 0° to 180°, and preferably 0° to 90°.

In accordance with another embodiment of the disclosure, the sprocket mount is lockable in the working position and/or in the transit position relative to the chassis frame. In this embodiment, the sprocket mount, especially in road transit, is unable to make any uncontrolled movements. This is why the relative position of the sprocket mount is lockable in at least one of the two final positions relative to the chassis frame.

In accordance with another embodiment of the disclosure, the sprocket is powered by a hydraulic drive. In this embodiment, when the hydraulic drive comprises at least one hydraulic tubing, preferably a flexible hydraulic tubing is mounted on the sprocket mount. In one embodiment, the hydraulic tubing remains connected to the sprocket mount in the restricted range of movement between the working position and the transit position. This enables the sprocket mount together with the flexible hydraulic tubing connected thereto to move from the working position, as described, into the transit position or vice-versa without it being necessary to disconnect the hydraulic tubing or also having to drain the hydraulic tubing.

This avoids the time-consuming hassle of having to remove and refit the hydraulic tubing. Since a piste grooming vehicle features in addition to the actual sprockets also several idlers for supporting the track, it is expedient when the idlers are mounted on the chassis frame via mounts. This results in an advantageous aspect of the disclosure in that the mounts are arranged on the chassis frame releasably secured, and preferably bolted, in thus eliminating any parts projecting from the chassis frame during transit constituting an accident risk.

Additional features and advantages are described herein, and will be apparent from, the following Detailed Description and the figures.

BRIEF DESCRIPTION OF THE FIGURES

Further details of the disclosure will now be explained with reference to the drawing in which.

DETAILED DESCRIPTION

Figure 1:
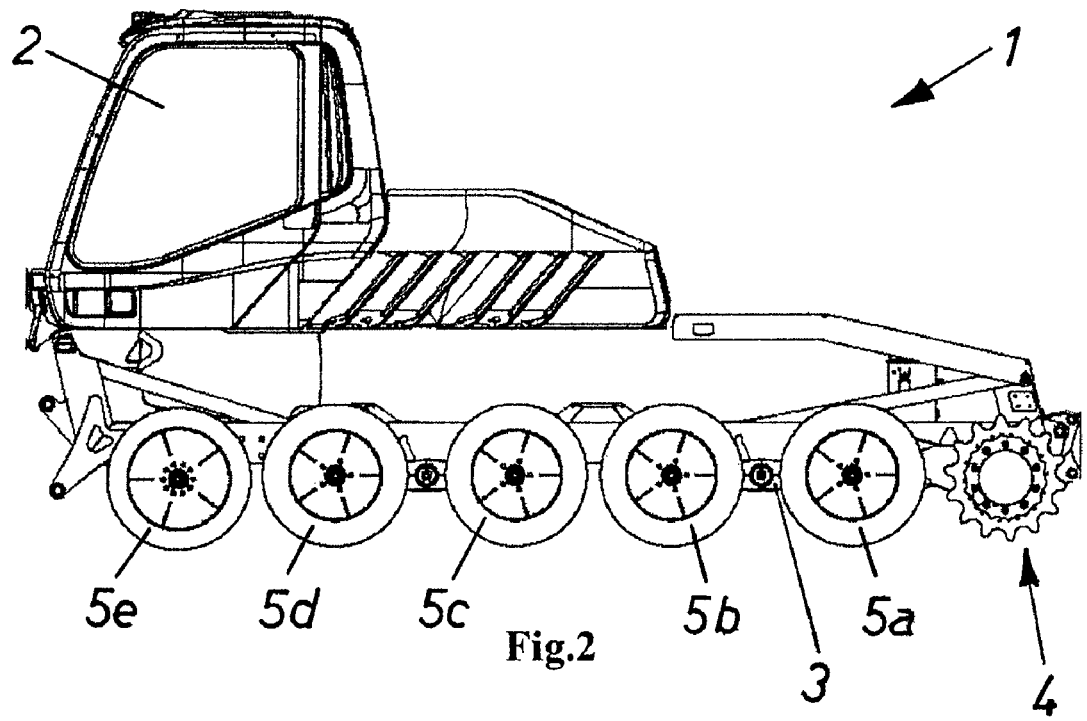
FIG. 1 is a side view of one embodiment of a piste grooming vehicle.

Referring now to FIG. 1, there is illustrated a diagrammatic side view of a piste grooming vehicle 1 comprising a driver's cab 2 mounted on a substantially rectangular chassis frame 3. Arranged on the chassis frame 3 on each side of the piste grooming vehicle 1 is at least one sprocket 4 for a track (not shown) for driving the vehicle. Provided in addition to the sprocket 4 are idlers 5a-5e for supporting the track. It should be appreciated that the embodiment shown is intended merely as an example. Indeed, a plurality of sprockets 4 on each side of the piste grooming vehicle 1 may also be provided, the sprockets 4 having limited movement from the described working position into the transit position and vice-versa.

Figure 2:
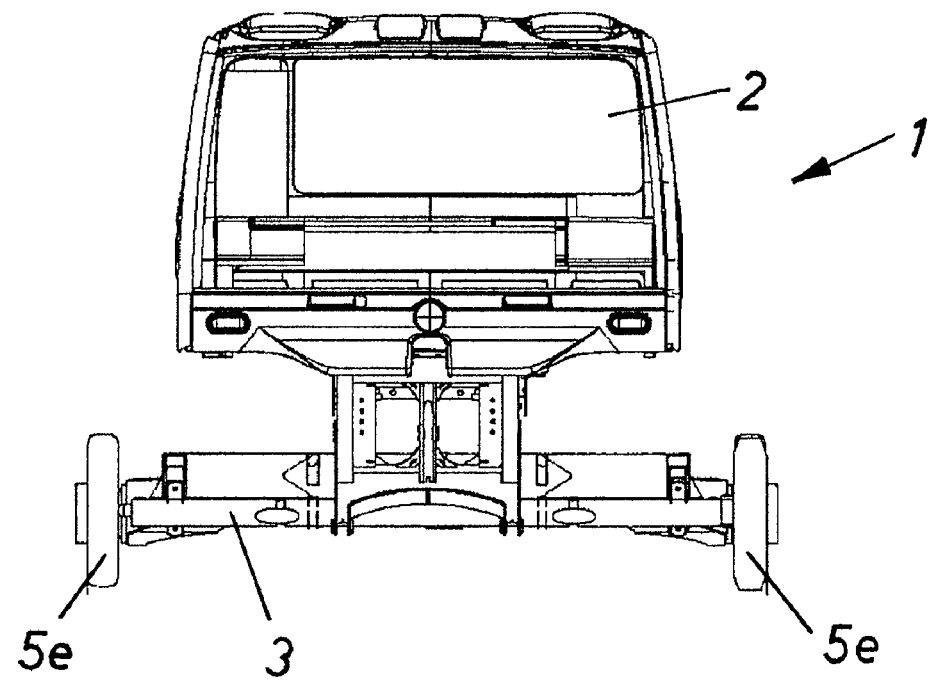
FIG. 2 is a front view of the piste grooming vehicle of FIG. 1.

Referring now to FIG. 2, there is illustrated a front view of the piste grooming vehicle 1 showing the driver's cab 2 and the idlers 5e mounted on the chassis frame 3 on both sides of the vehicle.

Figure 3:
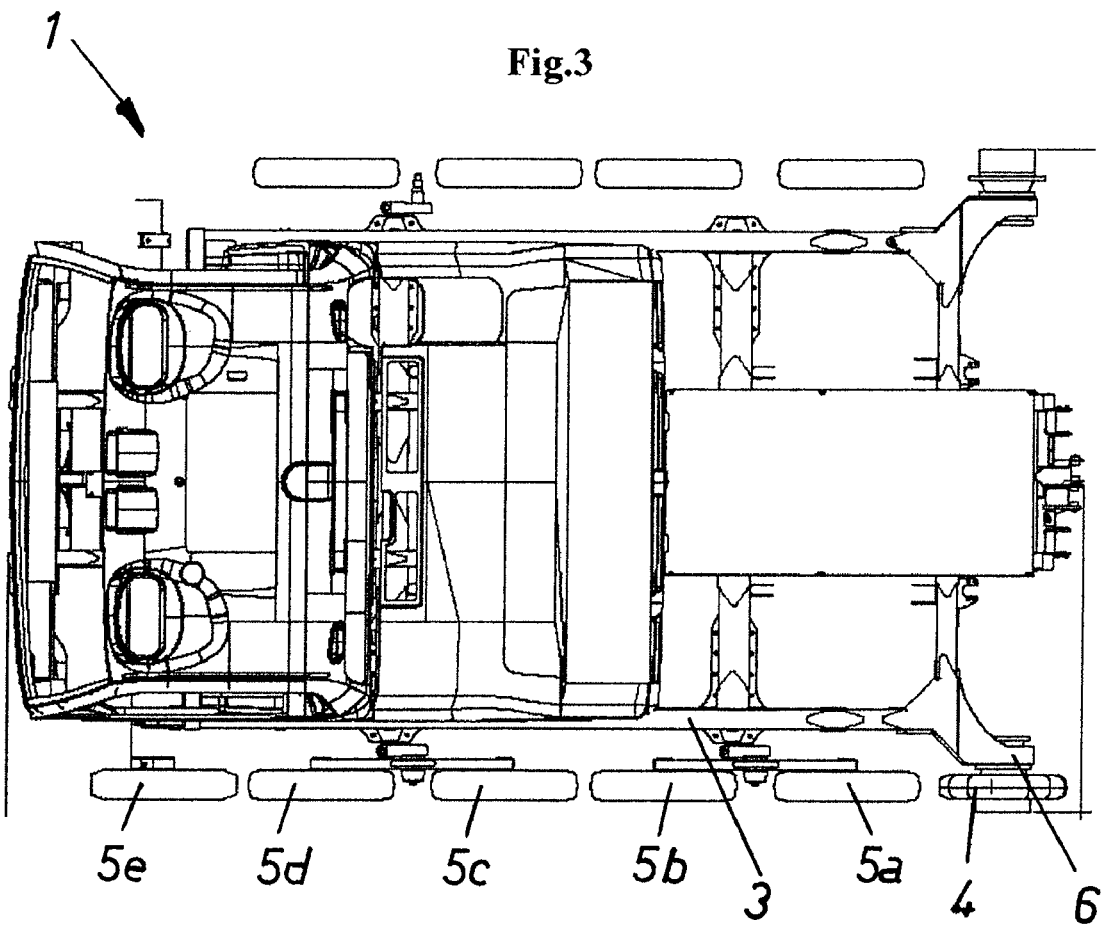
FIG. 3 is a top-down view of the piste grooming vehicle of FIG. 1.

Referring now to FIG. 3, there is illustrated a diagrammatic top-down view of the piste grooming vehicle 1. The following relates just to the lower sprocket 4 and to the configuration of the idlers 5a-5e (i.e., on the left-hand side of the vehicle).

Provided at the chassis frame 3 in addition to the load-communicating idlers 5a-5e is the sprocket 4 for the track. The sprocket 4 is mounted on the chassis frame 3 by a sprocket mount 6. The sprocket 4 is shown in the working position (i.e., in the position as usual for powering the track in piste grooming). In accordance with the disclosure, at least one sprocket 4 or its sprocket mount 6 has limited movement relative to the chassis frame 3 such that the sprocket 4 and its sprocket mount 6 respectively can be moved into a transit position which is within the width B of the chassis frame 3 as detailed in the comments as to the following figures.

Figure 4A:
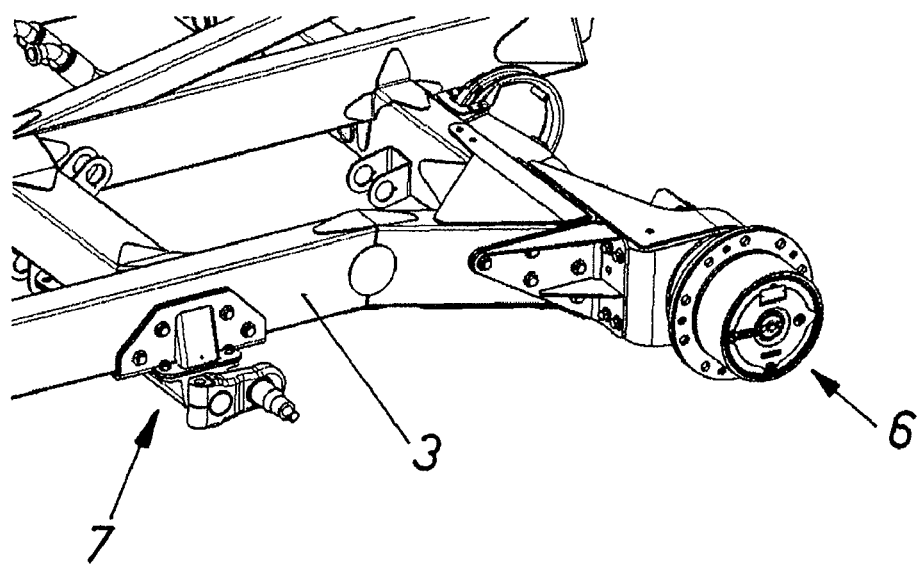
FIG. 4a is a view in detail of a chassis frame mounted sprocket mount in the working position as viewed in a perspective front view.

Referring now to FIG. 4a, there is illustrated a front view in perspective of the chassis frame 3 with the sprocket 4 and idlers 5a removed to show the sprocket mount 6 and the mount 7 for the idler 5a. As shown in this FIG., the sprocket mount 6 is in the working position in which it projects sideways from the chassis frame 3. The mount 7 for the idler 5a comprises a releasable fastener for releasably connecting the mount 7 with the chassis frame 3 (i.e., the mount 7 can be easily unbolted from the chassis frame 3 for transit).

Figure 4B:
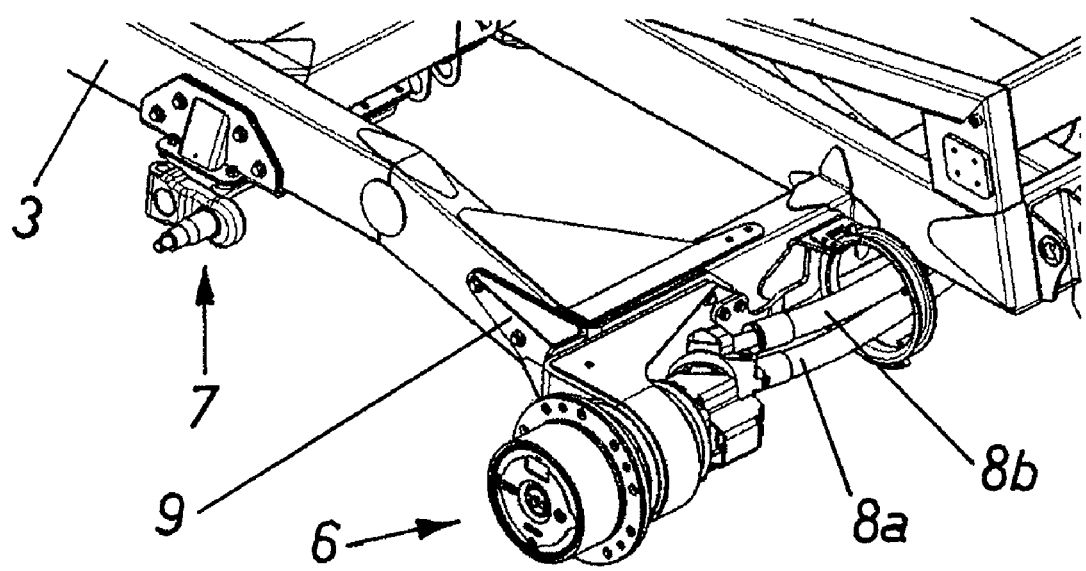
FIG. 4b is a view in detail of a chassis frame mounted sprocket mount in the working position as viewed in a perspective rear view.

Referring now to FIG. 4b, there is illustrated the same as in FIG. 4a in a perspective rear view in which the flexible hydraulic tubing 8a and 8b are evident as part of a hydraulic transmission for the sprocket 4. Also evident is a wedge-shaped fastener 9 for locking the relative position of the sprocket mount 6 in the working position as well as in the transit position.

Figure 5:
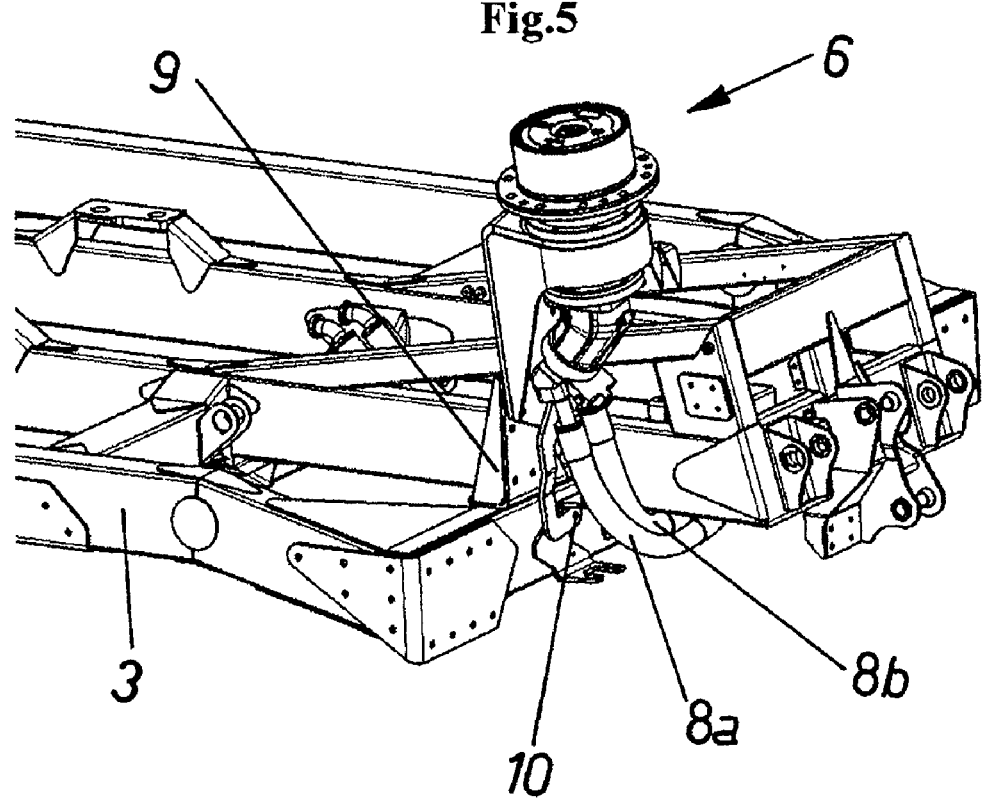
FIG. 5 is a perspective rear view of the sprocket mount pivoted in the transit position.

Referring now to FIG. 5, there is illustrated the sprocket mount 6 pivoted into the transit position. For this purpose the wedge-shaped fastener 9 (as seen in FIG. 4b) has been unbolted so that the sprocket mount 6 can be pivoted about at least one—preferably horizontal—axis, resulting in the sprocket mount 6 now being within the width B (FIG. 3) of the chassis frame 3. It is evident how the two flexible hydraulic tubings 8a and 8b always remain connected to the sprocket mount 6 during the limited movement between the working position as shown in FIG. 4b and the transit position as shown in FIG. 5 to thus eliminate the time and trouble as would otherwise be needed to remove and refit the flexible hydraulic tubing 8a and 8b. The unbolted fastener 9 as shown in FIG. 4b is then bolted relocated to lock the transit position. Thus, one and the same fastener 9 serves to lock both final positions.

Figure 6A:
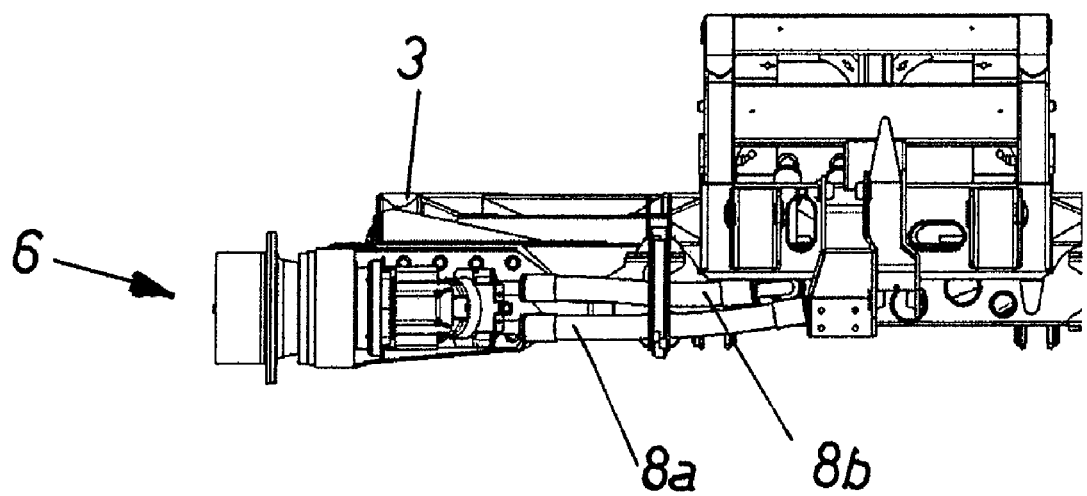
FIG. 6a is rear view of the sprocket mount in the working position.
Figure 6B:
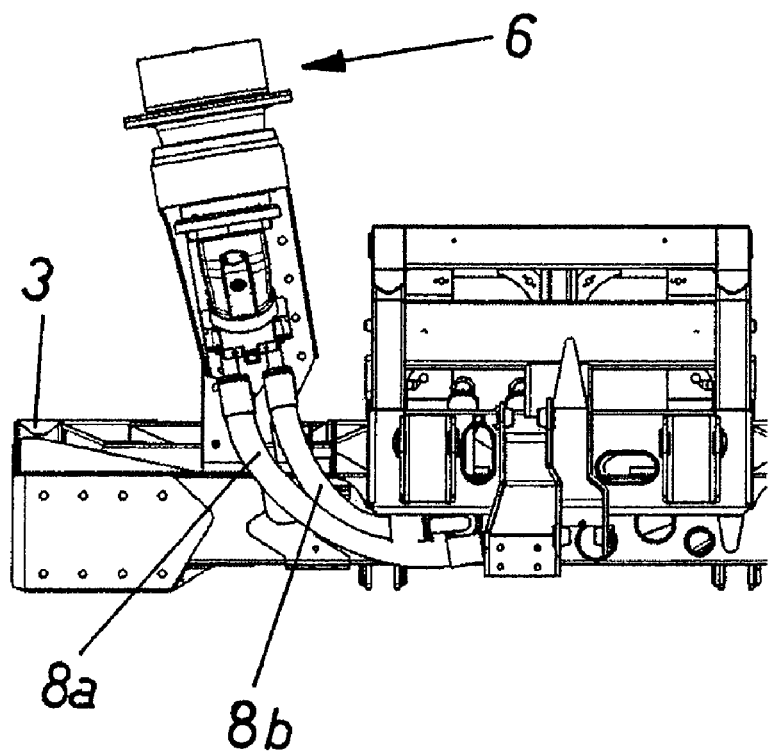
FIG. 6b is a rear view of the sprocket mount in the transit position.

Referring now to FIGS. 6a and 6b, there is illustrated the working position (FIG. 6a) as compared to the transit position (FIG. 6b) in a rear view. The range available for pivoting the sprocket mount 6 is preferably from 0° to 90°. It being in any case favorable, however, that the sprocket mount 6 in the transit position remains within the width of the chassis frame 3.

Figure 7A:
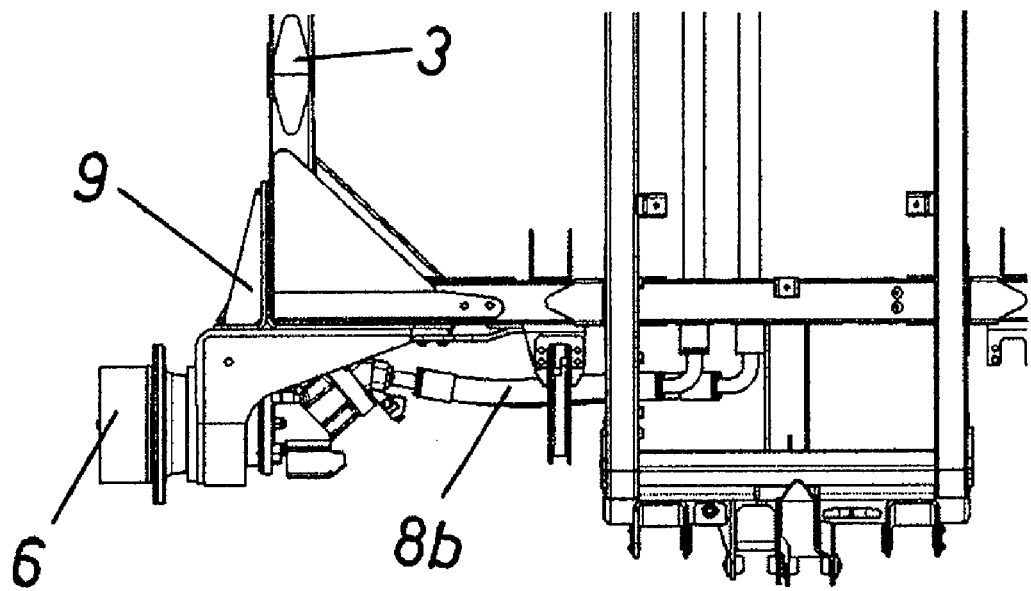
FIG. 7a is a top-down view of the sprocket mount in the working position.
Figure 7B:
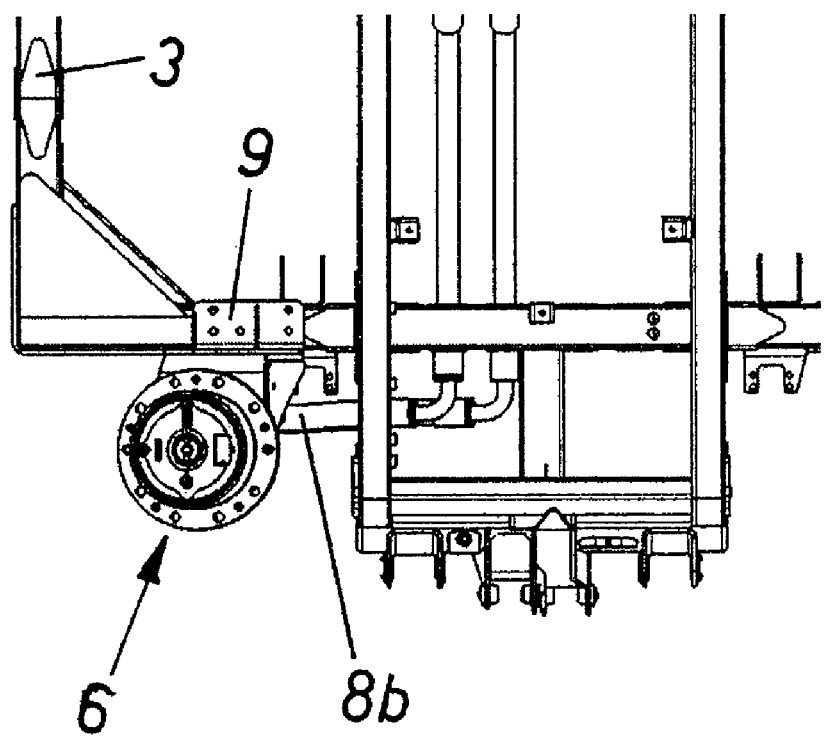
FIG. 7b is a top-down view of the sprocket mount in the transit position.

Referring now to FIGS. 7a and 7b, there is illustrated the working position (FIG. 7a) as compared to the transit position (FIG. 7b) in a top-down view. Evident in FIG. 7a is the fastener 9 locking the working position whilst in FIG. 7b the fastener 9 is mounted relocated in locking the transit position.

The present invention is not restricted to the embodiment shown, it instead covers all and any technical variants and technical equivalents within the scope as claimed. The locational indications too, as selected in the description, such as for instance, up, down, side etc. relate to the usual position as installed or to the FIGs. as described directly and shown and in a change in position are to be transposed correspondingly to the new position. The means for limited pivoting of the sprocket 4 or its sprocket mount 6 between the working position and the transit position can, of course, feature at least one, preferably hydraulically powered, piston-cylinder unit.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A tracked piste grooming vehicle comprising:
   a chassis frame having a width;
   a sprocket mount directly fastened to the chassis; and
   a sprocket for a piste grooming vehicle track, said sprocket rotatably coupled to the sprocket mount and configured to drive the tracked piste grooming vehicle, wherein:
   (a) the sprocket is moveable to a working position in which:
      (i) the sprocket protrudes beyond the width of the chassis frame, and
      (ii) the piste grooming vehicle track can be attached to the sprocket and a plurality of idlers attached to the chassis frame; and
   (b) the sprocket is moveable to a transit position in which:
      (i) the sprocket is located at least partially within the width of the chassis frame, and
      (ii) the piste grooming vehicle track cannot be attached to the sprocket and the plurality of idlers.

2. The tracked piste grooming vehicle of claim 1, wherein the sprocket is located totally within the width of the chassis frame when moved into the transit position.

3. The tracked piste grooming vehicle of claim 1, wherein the sprocket mount is pivotable about a horizontal axis.

4. The tracked piste grooming vehicle of claim 1, wherein the sprocket mount is lockable in each of the working position and the transit position relative to the chassis frame.

5. The tracked piste grooming vehicle of claim 4, which includes at least one fastener releasably securable to a plurality of different areas of the chassis frame and to the sprocket mount.

6. The tracked piste grooming vehicle of claim 5, wherein a same fastener is provided to lock the working position and the transit position.

7. The tracked piste grooming vehicle of claim 1, wherein the sprocket is powered by a hydraulic drive.

8. The tracked piste grooming vehicle of claim 7, wherein the hydraulic drive includes at least one flexible hydraulic tubing mounted on the sprocket mount.

9. The tracked piste grooming vehicle of claim 8, wherein the hydraulic tubing remains connected to the sprocket mount during movement of the sprocket from the working position to the transit position and during movement of the sprocket from the transit position to the working position.

10. The tracked piste grooming vehicle of claim 1, wherein the idlers are attached to the chassis frame via a plurality of mounts.

11. The tracked piste grooming vehicle of claim 10, wherein the idler mounts are releasably secured to the chassis frame.

12. The tracked piste grooming vehicle of claim 1, which includes a plurality of sprockets for a plurality of piste grooming vehicle tracks, each of said sprockets configured to drive the vehicle, wherein each sprocket is movable to a working position for said sprocket in which said sprocket protrudes beyond the width of the chassis frame and is movable to a transit position for said sprocket in which said sprocket is located at least partially within the width of the chassis frame.

13. A tracked piste grooming vehicle comprising:
   a chassis frame having a width;

a sprocket mount mounted on the chassis frame; and
a sprocket for a piste grooming vehicle track, said sprocket rotatably coupled to the sprocket mount and configured to drive the tracked piste grooming vehicle, the sprocket moveable to a working position in which: (i) the sprocket protrudes beyond the width of the chassis frame, and (ii) the piste grooming vehicle track can be attached to the sprocket and a plurality of idlers attached to the chassis frame, and movable to a transit position in which: (i) the sprocket is located at least partially within the width of the chassis frame, and (ii) the piste grooming vehicle track cannot be attached to the sprocket and the plurality of idlers, the sprocket pivotable about an axis transverse to an axis of the sprocket when the sprocket is in the working position.

14. A tracked piste grooming vehicle comprising:
a chassis frame having a width;
a sprocket mount mounted on the chassis frame; and
a sprocket for a piste grooming vehicle track, said sprocket rotatably coupled to the sprocket mount and configured to drive the tracked piste grooming vehicle, the sprocket moveable to a working position in which: (i) the sprocket protrudes beyond the width of the chassis frame, and (ii) the piste grooming vehicle track can be attached to the sprocket and a plurality of idlers attached to the chassis frame, and movable to a transit position in which: (i) the sprocket is located at least partially within the width of the chassis frame, and (ii) the piste grooming vehicle track cannot be attached to the sprocket and the plurality of idlers, the sprocket mounted on the chassis frame by the sprocket mount, the sprocket mount lockable in the working position relative to the chassis frame by at least one fastener releasably securable to a first area of the chassis frame and to the sprocket mount and the sprocket mount lockable in the transit position relative to the chassis frame by said at least one fastener releasably securable to a second, different area of the chassis frame and to the sprocket mount.

15. A tracked piste grooming vehicle comprising:
a chassis frame having a width;
a sprocket mount mounted on the chassis frame;
a sprocket for a piste grooming vehicle track, said sprocket rotatably coupled to the sprocket mount and configured to drive the tracked piste grooming vehicle, the sprocket being:
  (a) moveable to a working position in which the sprocket protrudes beyond the width of the chassis frame and the piste grooming vehicle track can be attached to the sprocket and a plurality of idlers attached to the chassis frame,
  (b) movable to a transit position in which the sprocket is located totally within the width of the chassis frame and the piste grooming vehicle track cannot be attached to the sprocket and the plurality of idlers,
  (c) mounted on the chassis frame by the sprocket mount, said sprocket mount lockable in the working position relative to the chassis frame by at least one fastener releasably securable to a first area of the chassis frame and to the sprocket mount and the sprocket mount lockable in the transit position relative to the chassis frame by said at least one fastener releasably securable to a second, different area of the chassis frame and to the sprocket mount, and
  (d) pivotable about an axis transverse to an axis of the sprocket when the sprocket is in the working position; and
a hydraulic drive configured to power the sprocket, said hydraulic drive including at least one flexible hydraulic tubing mounted on the sprocket mount, said hydraulic tubing remaining connected to the sprocket mount during movement of the sprocket from the working position to the transit position and during movement of the sprocket from the transit position to the working position.

* * * * *